United States Patent
Cernohous et al.

(10) Patent No.: US 12,548,698 B2
(45) Date of Patent: Feb. 10, 2026

(54) BUSHING FOR A MEDIUM VOLTAGE SWITCHGEAR

(71) Applicant: ABB Schweiz AG, Baden (CH)

(72) Inventors: Josef Cernohous, Jamne nad Orlici (CZ); Jakub Horak, Brno (CZ); Dariusz Bednarowski, Cracow (PL)

(73) Assignee: ABB Schweiz AG, Baden (CH)

( * ) Notice: Subject to any disclaimer, the term of this patent is extended or adjusted under 35 U.S.C. 154(b) by 289 days.

(21) Appl. No.: 18/499,439

(22) Filed: Nov. 1, 2023

(65) Prior Publication Data
US 2024/0145131 A1    May 2, 2024

(30) Foreign Application Priority Data
Nov. 2, 2022   (EP) .................... 22205028

(51) Int. Cl.
*H01B 7/26* (2006.01)
*H01B 17/26* (2006.01)
*H02B 13/02* (2006.01)

(52) U.S. Cl.
CPC ............. *H01B 17/26* (2013.01); *H02B 13/02* (2013.01)

(58) Field of Classification Search
CPC ........ H01B 17/26; H02B 13/02; H02B 11/04; H02B 1/20
See application file for complete search history.

(56) References Cited

U.S. PATENT DOCUMENTS

2021/0249161 A1* 8/2021 Horak .................... H02B 1/015

FOREIGN PATENT DOCUMENTS

EP   3863135 A1   8/2021
JP   55-130518 U  9/1980

OTHER PUBLICATIONS

European Patent Office, Extended European Search Report in European Patent Application No. 22205028.8, 8 pp. (Mar. 29, 2023).

* cited by examiner

*Primary Examiner* — Sherman Ng
(74) *Attorney, Agent, or Firm* — Fitch Even Tabin & Flannery LLP

(57) ABSTRACT

A bushing for a metal clad medium voltage switchgear includes a hollow body and a t-off and pin assembly. The hollow body is made from polyamide. The t-off and pin assembly is made from polyamide. A first end of the hollow body is configured to connect to a compartment of a medium voltage switchgear. The t-off and pin assembly is configured to connect to a second end of the hollow body. The t-off and pin assembly is configured to connect to a T-off and pin.

12 Claims, 2 Drawing Sheets

Figure 1:
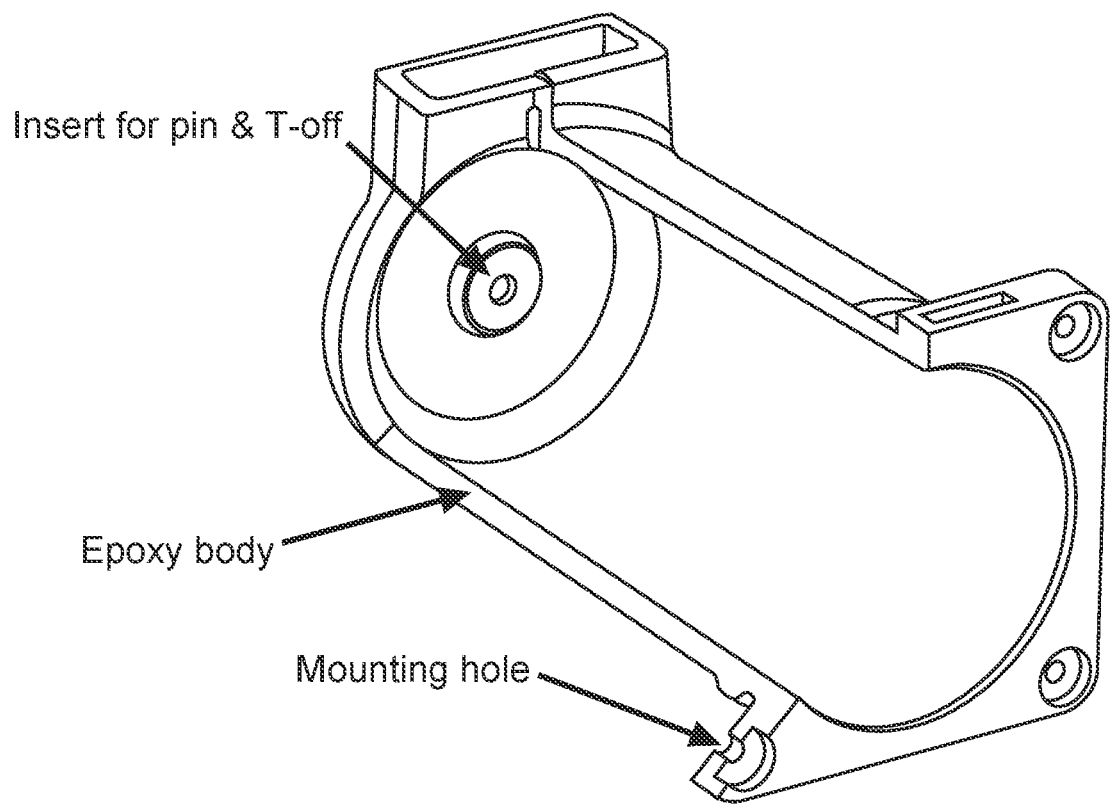

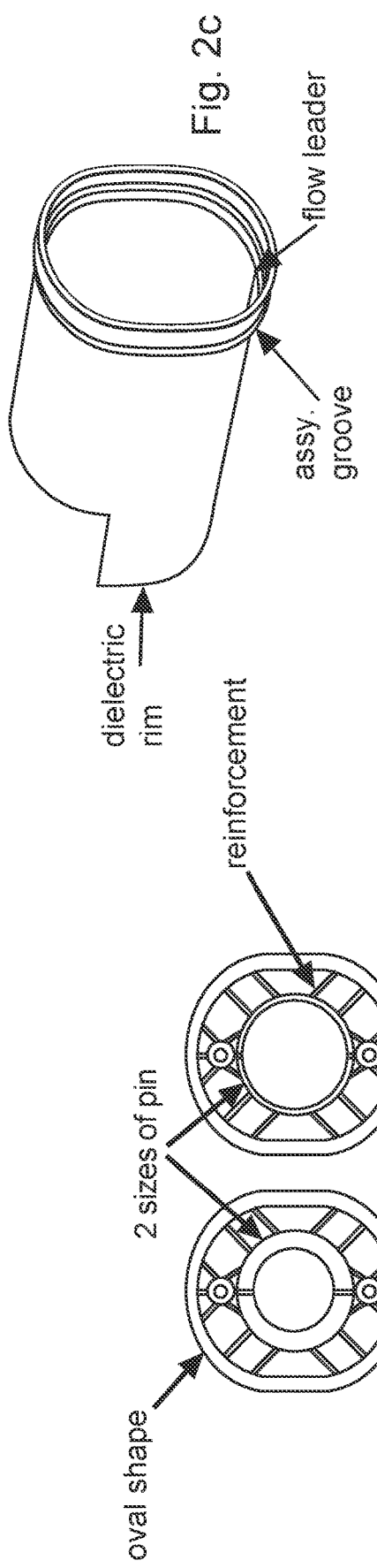
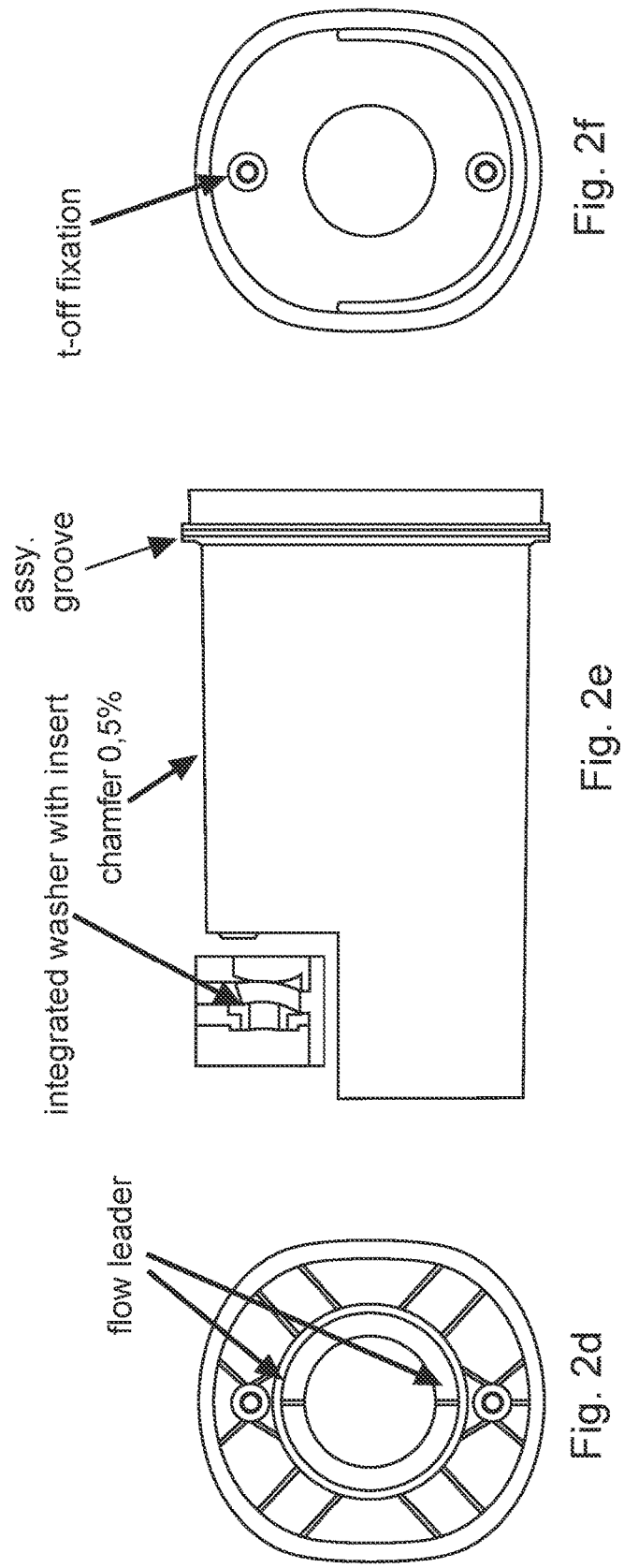

BUSHING FOR A MEDIUM VOLTAGE SWITCHGEAR

CROSS-REFERENCE TO RELATED APPLICATIONS

The instant application claims priority to European Patent Application No. 22205028.8, filed Nov. 2, 2022, which is incorporated herein in its entirety by reference.

FIELD OF THE DISCLOSURE

The present disclosure relates to a bushing for a medium voltage switchgear and, more particularly, to a bushing system for a metal clad medium voltage switchgear.

BACKGROUND OF THE INVENTION

In a medium voltage switchgear (or panel) with metal partitions, bushings are important parts of the panel. Bushings, which can also be called spouts (1 per phase) or monoblocs (1 for all 3 phases), can for example be used with circuit breaker compartments.

Bushings allow current flow between metal-clad switchgear through compartments, and due to high current and/or high voltage parameters, they are large in size and need a significant amount of insulating material that is usually epoxy, which is not possible to recycle.

FIG. 1 shows an existing epoxy bushing or spout, represented in a partial cut out form, where for example the spout is mounted by 4 screws to a metal plate, such as a contact support, which forms a partition between a circuit breaker compartment and other compartments in the panel. The spout has an insert in the rear wall used for assembling T-offs and pins. The existing spout however is expensive, difficult to assemble, and large.

BRIEF SUMMARY OF THE INVENTION

It would be advantageous to have an improved bushing for a compartment of a medium voltage switchgear, such as an air or gas insulated switchgear. It is to be noted that the embodiments for a busing described herein are described with respect to a medium voltage air or gas insulated switchgear but find utility in other situations for the connection of high voltage current carrying conductors between compartments. In an aspect, there is provided a bushing for a metal clad medium voltage switchgear, the bushing comprising a hollow body, and a t-off and pin assembly. The hollow body is made from polyamide. The t-off and pin assembly is made from polyamide. A first end of the hollow body is configured to connect to a compartment of a medium voltage switchgear. The t-off and pin assembly is configured to connect to a second end of the hollow body. The t-off and pin assembly is configured to connect to a T-off and pin.

The new bushing or spout has parts made from recyclable polyamide material, which is also lighter, and less expensive than existing bushings, and by having an independent t-off and pin assembly, different t-off and pin assembly pieces can be used to connect to two different sizes of pin. This means that the main part of the bushing can be used in different situations, requiring a change in the t-off and pin assembly from a part that matches a first size of pin to a part that matches a second size of pin.

In other words, a modular design is provided that allows the use of different pin diameters and that replaces existing epoxy designs, and that can be used at 12 kV and 17 kV and 24 kV for example, and at currents greater than 1250 A, not only is material mass and environmental impact reduced by using a thermoplastic, but larger and different sizes of conductors (pins) can be accommodated allowing for higher current flow and flexibility of utilization, and ease of installation and replacement is enabled.

The new modular arrangement of having a separate hollow body and t-off and pin assembly means that different t-off and pin assembly pieces can be used to connect to different sizes of pin. Thus, an installer or repair person need only carry along one hollow body with multiple t-off and pin assemblies for different sized pins when attending a job and can select the correct t-off and pin assembly for the situation in hand. Then this selected t-off and pin assembly could then be connected to the hollow body, and fixed, for example with glue and/or be a friction fit or other connection. The bushing can then be left in position. This then addresses the existing situation, where the installer or repair person has to carry multiple complete bushings each with different t-off and pin assemblies, where now less parts need to be carried—for example only one hollow body and multiple t-off and pin assemblies.

BRIEF DESCRIPTION OF THE SEVERAL VIEWS OF THE DRAWING(S)

Exemplary embodiments will be described in the following with reference to the following drawings:

FIG. 1 shows a schematic representation of an example of an existing bushing or spout for a metal clad medium voltage switchgear.

FIGS. 2a, 2b, 2c, 2d, 2e, and 2f show a bushing or spout for a metal clad medium voltage switchgear from different perspectives in accordance with the disclosure. More specifically, FIG. 2c is an isometric view, FIG. 2e is a side view, FIGS. 2a and 2b are views of two different t-off and pin assemblies for different sized pins, FIG. 2f is a front view, and FIG. 2d is a rear view of one of the two t-off and pin assemblies.

DETAILED DESCRIPTION OF THE INVENTION

FIGS. 2a-2f relate to a new bushing or spout for a metal clad medium voltage switchgear. The bushing comprises a hollow body, and a t-off and pin assembly. In these figures, the hollow body is shown in isometric view at the top right and inside view in the middle at the bottom. At the top right, two different t-off and pin assemblies are shown, sized for different pins. Either side of the side view of the hollow body one of these two t-off and pin assemblies is shown, viewed from the inside and outside wen attached or connected to the hollow body. The hollow body is made from polyamide. The t-off and pin assembly is made from polyamide. A first end of the hollow body is configured to connect to a compartment of a medium voltage switchgear. The t-off and pin assembly is configured to connect to a second end of the hollow body. The t-off and pin assembly is configured to connect to a T-off and pin.

The new bushing or spout has parts made from recyclable polyamide material, which is also lighter, and less expensive than existing bushings, and by having an independent t-off and pin assembly, different t-off and pin assembly pieces can be used to connect to two different sizes of pin. This means that the main part of the bushing can be used in different situations, requiring a change in the t-off and pin assembly from a part that matches a first size of pin to a part that matches a second size of pin.

The new modular arrangement of having a separate hollow body and t-off and pin assembly means that different t-off and pin assembly pieces can be used to connect to different sizes of pin. Thus, an installer or repair person need only carry along one hollow body with multiple t-off and pin assemblies for different sized pins when attending a job and can select the correct t-off and pin assembly for the situation in hand. Then this selected t-off and pin assembly could then be connected to the hollow body, and fixed, for example with glue and/or be a friction fit or other connection. The bushing can then be left in position. This then addresses the existing situation, where the installer or repair person has to carry multiple complete bushings each with different t-off and pin assemblies, where now less parts need to be carried—for example only one hollow body and multiple t-off and pin assemblies.

According to an example, the t-off and pin assembly comprises at least one t-off fixation hole with an integrated washer. By having an integrated washer, better dielectric test performance is provided. According to an example, the t-off and pin assembly comprises a pin opening. The pin opening is sized for the size of pin, and in this way connection to different sized pins can be made by only changing the t-off and pin assembly to one with the correctly sized pin opening.

According to an example, a body portion extends from the first end of the hollow body to the second end of the hollow body, and the body portion is substantially oval shaped about an axis extending from the first end of the body to the second end of the body. In this manner by having an oval shape, better results of TRT are provided.

According to an example, an outer surface of the body portion is chamfered such that the outer surface is angled to the axis in a direction from the first end of the body to the second end of the body. In other words, the outer surface of the body does not have a constant oval cross-section but has an oval cross-section that varies in size along its length. This improves water drainage in condensation conditions.

In an example, the chamfer is 0.5%, 0.3%, 1%, 2%, 5%, or 10%.

According to an example, an internal surface of the body portion comprises at least one flow leader. The flow leaders facilitate manufacture of the part. According to an example, a flow leader is in a direction perpendicular to the axis in the direction from the first end of the body to the second end of the body.

According to an example, a surface of the t-off and pin assembly that faces inwards to the hollow body when the t-off and pin assembly is connected to the hollow body comprises at least one flow leader. The flow leaders facilitate manufacture of the part.

According to an example, a surface of the t-off and pin assembly that faces inwards to the hollow body when the t-off and pin assembly is connected to the hollow body comprises at least one reinforcement part. The reinforcements enable the overall thickness of the part to be reduced, with the overall weight of the part also being reduced, which also leads to reduced cost of the component. According to an example, the at least one reinforcement part comprises raised ridges in the surface of the t-off and pin assembly.

According to an example, the second end of the hollow body comprises a dielectric rim, which improves dielectric performance.

According to an example, the first end of the body is configured to connect to the compartment of the switchgear via at least one assembly groove. According to an example, the t-off and pin assembly has an outer perimeter that is oval shaped. A single hollow body can be provided with two or more t-off and pin assemblies, each designed for a different size of pin—as shown in FIGS. 2a and 2b.

Such a system comprises a hollow body, a first t-off and pin assembly, and a second t-off and pin assembly. The hollow body is made from polyamide. The first t-off and pin assembly is made from polyamide. The first t-off and pin assembly has a pin opening of a first size. The second t-off and pin assembly is made from polyamide. The second t-off and pin assembly has a pin opening of a second size. A first end of the hollow body is configured to connect to a compartment of a medium voltage switchgear. The first t-off and pin assembly is configured to connect to a second end of the hollow body. The second t-off and pin assembly is configured to connect to the second end of the hollow body. The first t-off and pin assembly is configured to connect to a T-off and pin. The second t-off and pin assembly is configured to connect to a T-off and pin. In use either the first t-off and pin assembly is connected to the hollow body or the second t-off and pin assembly is connected to the hollow body.

In an example, the first t-off and pin assembly comprises at least one t-off fixation hole with an integrated washer. In an example, the second t-off and pin assembly comprises at least one t-off fixation hole with an integrated washer. In an example, a body portion extends from the first end of the hollow body to the second end of the hollow body, and the body portion is substantially oval shaped about an axis extending from the first end of the body to the second end of the body. In an example, an outer surface of the body portion is chamfered such that the outer surface is angled to the axis in a direction from the first end of the body to the second end of the body. In an example, the chamfer is 0.5%, 0.3%, 1%, 2%, 5%, or 10%.

In an example, an internal surface of the body portion comprises at least one flow leader. The flow leader is in a direction perpendicular to the axis in the direction from the first end of the body to the second end of the body. In an example, a surface of the first t-off and pin assembly that faces inwards to the hollow body when the first t-off and pin assembly is connected to the hollow body comprises at least one flow leader. In an example, a surface of the second t-off and pin assembly that faces inwards to the hollow body when the second t-off and pin assembly is connected to the hollow body comprises at least one flow leader.

In an example, a surface of the first t-off and pin assembly that faces inwards to the hollow body when the first t-off and pin assembly is connected to the hollow body comprises at least one reinforcement part. In an example, a surface of the second t-off and pin assembly that faces inwards to the hollow body when the second t-off and pin assembly is connected to the hollow body comprises at least one reinforcement part.

In an example, the at least one reinforcement part of the first t-off and pin assembly comprises raised ridges in the surface of the first t-off and pin assembly. In an example, the at least one reinforcement part of the second t-off and pin assembly comprises raised ridges in the surface of the second t-off and pin assembly. In an example, the second end of the hollow body comprises a dielectric rim. In an example, the first end of the body is configured to connect to the compartment of the switchgear via at least one assembly groove.

In an example, the first t-off and pin assembly has an outer perimeter that is oval shaped. In an example, the second t-off and pin assembly has an outer perimeter that is oval shaped.

As shown in FIGS. 2a-f, one end of the bushing as a dielectric rim that provides better results in dielectric tests. An assembly groove or grooves provided to enable connection to a compartment of the switchgear without requiring screws or bolts, with an internal flow leader in an inner surface of the body of the bushing, which facilitates manufacture. The overall shape of the hollow body of the bushing and independent t-off and pin assemblies is oval, which results in better TRT. The t-off and pin assembly is independent and has a central opening sized to the size of a pin, enabling different t-off and pin assemblies to be used as required. The inner surface of the t-off and pin assembly also has a flow leader to aid manufacture, and modeling and simulation was used to design raised reinforcement ridges. The modelling and simulation used to design the reinforcement profiles or ridges took into account the properties polyamide. The body of the bushing is slightly tapered or chamfered, providing for improved drainage in condensation conditions. The t-off and pin assembly also has t-off fixation holes with an integrated washer with insert, that also yielded better results in dielectric tests.

Thus, the new bushing or spout is made from recyclable polyamide material, with computer simulations used to design reinforcements providing for maintenance of structural integrity for less overall material. The new design has independent t-off and pin assemblies that come with different pin openings for flexibility of utilization, and with flow leaders for improved manufacturability and reinforcement ridges for weight reduction. The new bushing features a fastener-less assembly (partial), with a built-in dielectric rim, with a chamfer of 0.5% for improved drain in condensation conditions. The design can therefore be silicone-free and has lower weight and lower cost with respect to the existing bushings.

Bushings are important components of metal-clad switchgear. Existing bushings or spout are screw-mounted and made of epoxy. The new bushing provides for partially fastener-free assembly (easier, faster), has advantage in improved drainage (increased reliability), weight (green) and cost, uses and recyclable thermoplastics (green), and provides for increased current operation, improved installation and replacement and flexibility of utility with respect to pin size.

Thus, the new bushing provides significant improvements over existing epoxy or epoxide bushings or spouts. In an example, the t-off and pin assembly comprises at least one t-off fixation hole with an integrated washer. By having an integrated washer, better dielectric test performance is provided. In an example, the t-off and pin assembly comprises a pin opening. The pin opening is sized for the size of pin, and in this way connection to different sized pins can be made by only changing the t-off and pin assembly to one with the correctly sized pin opening.

In an example, a body portion extends from the first end of the hollow body to the second end of the hollow body, and the body portion is substantially oval shaped about an axis extending from the first end of the body to the second end of the body. In this manner by having an oval shape, better results of TRT are provided.

In an example, an outer surface of the body portion is chamfered such that the outer surface is angled to the axis in a direction from the first end of the body to the second end of the body.

In other words, the outer surface of the body does not have a constant oval cross-section but has an oval cross-section that varies in size along its length. This improves water drainage in condensation conditions. In an example, an internal surface of the body portion comprises at least one flow leader. The flow leaders facilitate manufacture of the part. In an example, a flow leader is in a direction perpendicular to the axis in the direction from the first end of the body to the second end of the body.

In an example, a surface of the t-off and pin assembly that faces inwards to the hollow body when the t-off and pin assembly is connected to the hollow body comprises at least one flow leader. The flow leaders facilitate manufacture of the part. In an example, a surface of the t-off and pin assembly that faces inwards to the hollow body when the t-off and pin assembly is connected to the hollow body comprises at least one reinforcement part. The reinforcements enable the overall thickness of the part to be reduced, with the overall weight of the part also being reduced, which also leads to reduced cost of the component.

In an example, the at least one reinforcement part comprises raised ridges in the surface of the t-off and pin assembly. In an example, the second end of the hollow body comprises a dielectric rim. It has been found that the dielectric rim improves dielectric performance. In an example, the first end of the body is configured to connect to the compartment of the switchgear via at least one assembly or assy. groove.

In an example, the t-off and pin assembly has an outer perimeter that is oval shaped. From the above, it is clear that a main part of a bushing, in terms of a hollow body, can be provided along with a number of different t-off and pin assembly, each sized for different pins enabling such a system to be utilized in different situations by using the appropriate t-off and pin assembly.

In an aspect there is provided a bushing system for a metal clad medium voltage switchgear, the bushing system comprising:
a hollow body;
a first t-off and pin assembly; and
a second t-off and pin assembly.

The hollow body is made from polyamide. The first t-off and pin assembly is made from polyamide. The first t-off and pin assembly has a pin opening of a first size. The second t-off and pin assembly is made from polyamide. The second t-off and pin assembly has a pin opening of a second size. A first end of the hollow body is configured to connect to a compartment of a medium voltage switchgear. The first t-off and pin assembly is configured to connect to a second end of the hollow body. The second t-off and pin assembly is configured to connect to the second end of the hollow body. The first t-off and pin assembly is configured to connect to a T-off and pin. The second t-off and pin assembly is configured to connect to a T-off and pin. In use either the first t-off and pin assembly is connected to the hollow body or the second t-off and pin assembly is connected to the hollow body.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A bushing for a metal clad medium voltage switchgear, the bushing comprising: a hollow body; and a t-off and pin assembly; wherein the hollow body is made from polyamide; wherein the t-off and pin assembly is made from polyamide; wherein a first end of the hollow body is configured to connect to a compartment of a medium voltage switchgear; wherein the t-off and pin assembly is configured to connect to a second end of the hollow body; wherein the t-off and pin assembly is configured to connect to a T-off and pin; wherein the t-off and pin assembly comprises at least one t-off fixation hole with an integrated washer; and wherein the t-off and pin assembly comprises a pin opening.

2. The bushing according to claim 1, wherein a body portion extends from the first end of the hollow body to the second end of the hollow body, and wherein the body portion is substantially oval shaped about an axis extending from the first end of the body to the second end of the body.

3. The bushing according to claim 2, wherein an outer surface of the body portion is chamfered such that the outer surface is angled to the axis in a direction from the first end of the body to the second end of the body.

4. The bushing according to claim 2, wherein an internal surface of the body portion comprises at least one flow leader.

5. The bushing according to claim 4, wherein a flow leader is in a direction perpendicular to the axis in the direction from the first end of the body to the second end of the body.

6. The bushing according to claim 1, wherein a surface of the t-off and pin assembly that faces inwards to the hollow body when the t-off and pin assembly is connected to the hollow body comprises at least one flow leader.

7. The bushing according to claim 1, wherein a surface of the t-off and pin assembly that faces inwards to the hollow body when the t-off and pin assembly is connected to the hollow body comprises at least one reinforcement part.

8. The bushing according to claim 7, wherein the at least one reinforcement part comprises raised ridges in the surface of the t-off and pin assembly.

9. The bushing according to claim 1, wherein the second end of the hollow body comprises a dielectric rim.

10. The bushing according to claim 1, wherein the first end of the body is configured to connect to the compartment of the switchgear via at least one assembly groove.

11. The bushing according to claim 1, wherein the t-off and pin assembly has an outer perimeter that is oval shaped.

12. A bushing system for a metal clad medium voltage switchgear, the bushing system comprising: a hollow body; a first t-off and pin assembly; and a second t-off and pin assembly; wherein the hollow body is made from polyamide; wherein the first t-off and pin assembly is made from polyamide; wherein the first t-off and pin assembly has a pin opening of a first size; wherein the second t-off and pin assembly is made from polyamide; wherein the second t-off and pin assembly has a pin opening of a second size; wherein the pin opening of the first size and the pin opening of the second size are different in size; wherein a first end of the hollow body is configured to connect to a compartment of a medium voltage switchgear; wherein the first t-off and pin assembly is configured to connect to a second end of the hollow body; wherein the second t-off and pin assembly is configured to connect to the second end of the hollow body; wherein the first t-off and pin assembly is configured to connect to a T-off and pin; wherein the second t-off and pin assembly is configured to connect to a T-off and pin; and wherein in use either the first t-off and pin assembly is connected to the hollow body or the second t-off and pin assembly is connected to the hollow body.

* * * * *